United States Patent [19]

Kobayashi et al.

[11] 4,440,354
[45] Apr. 3, 1984

[54] AUTOMATIC TENSION-ADJUSTING MECHANISM FOR WINDOW REGULATORS

[75] Inventors: Tetuo Kobayashi, Ikeda; Syoichi Hirai, Nishinomiya, both of Japan

[73] Assignee: Nippon Cable System Inc., Hyogo, Japan

[21] Appl. No.: 319,717

[22] Filed: Nov. 9, 1981

[30] Foreign Application Priority Data

Jun. 22, 1981 [JP] Japan .................................. 56-96985
Jul. 27, 1981 [JP] Japan ......................... 56-112093[U]

[51] Int. Cl.³ ......................... E05F 11/48; E05F 5/12; B65H 75/00
[52] U.S. Cl. ................................... 242/54 R; 49/352; 74/89.22; 254/342
[58] Field of Search ............... 254/342, 289, 299, 302, 254/127; 74/89.2, 89.22, 505, 506; 49/332, 352, 325, 349; 242/54 R

[56] References Cited

U.S. PATENT DOCUMENTS

| | | | |
|---|---|---|---|
| 915,114 | 3/1909 | Robin | 74/89.2 X |
| 2,555,859 | 6/1951 | Rappl et al. | 49/352 |
| 2,617,315 | 11/1952 | McClelland | 74/89.2 X |
| 4,158,270 | 6/1979 | Cherbourg et al. | 49/352 X |
| 4,191,060 | 3/1980 | Sessa | 254/342 X |
| 4,234,166 | 11/1980 | Cederblad | 242/54 R X |
| 4,235,117 | 11/1980 | Pickles | 74/89.2 |

*Primary Examiner*—Stuart S. Levy
*Assistant Examiner*—Scott J. Haugland
*Attorney, Agent, or Firm*—Armstrong, Nikaido, Marmelstein & Kubovcik

[57] ABSTRACT

A wire-driving device for a window regulator comprising a first pulley secured to a shaft supported rotatably to a casing, a second pulley secured to the shaft so as to be rotatable and axially movable along the shaft, and a wire of which both end portions are wound round said first pulley and second pulley respectively in the opposite direction to each other, the wire being capable to transmit power when the shaft is rotated, and ratchet teeth being provided on each of facing side surfaces of the pulleys, whereby elongation of the wire is automatically absorbed when the shaft is rotated to wind and unwind the wire round the pulleys.

4 Claims, 8 Drawing Figures

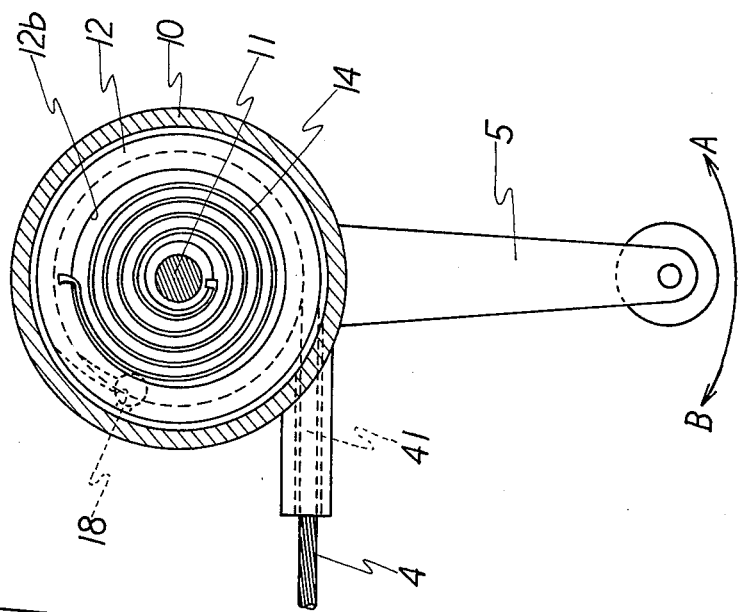
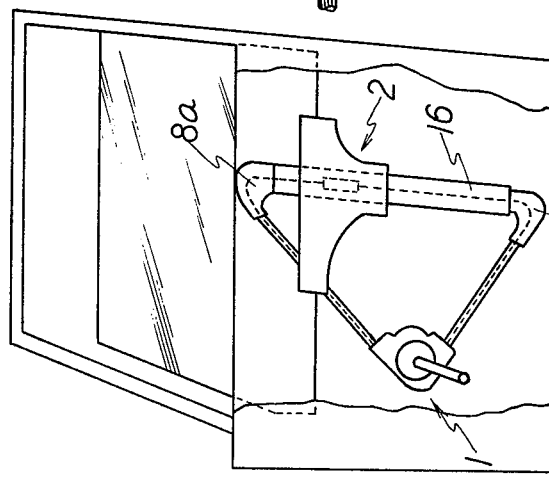
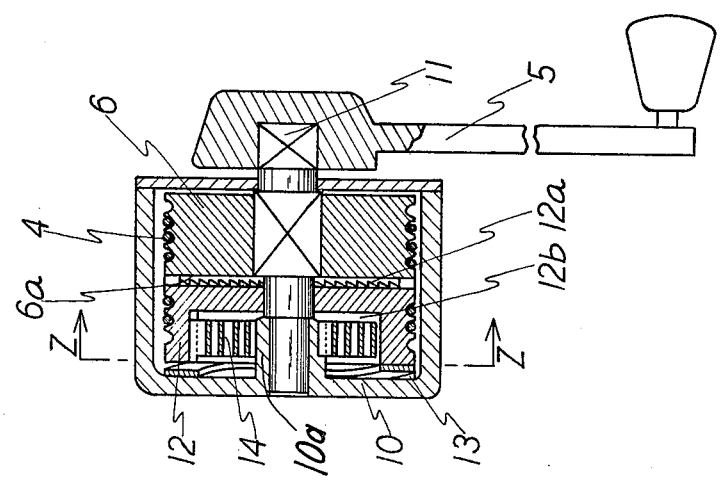

AUTOMATIC TENSION-ADJUSTING MECHANISM FOR WINDOW REGULATORS

BACKGROUND OF THE INVENTION

The present invention relates to a novel wire-driving device for a window regulator, and more particularly to a wire-driving device which can absorb automatically elongation generated in a wire transmitting power from the wire-driving device to a working device for raising and lowering of a window glass.

A wire comprising a strand of metal wire elements generally undergoes permanent elongation under a tension load. Permanent elongation does not permit the elongated wire to return to its initial length. The degree of the elongation is greater an initial stage of in use, but gradually becomes smaller, and continued tension on the wire finally results in almost non-elongation.

Elongation of the wire produces play between the wire-driving device and the working device in these functions, whereby the working device cannot be operates precisely. Thus, when the wire-driving device comes to stop, the working device still continues its function, and a window glass connected to the working device is moved in some degree without stopping in the desired position. Accordingly, it is unavoidable that the function of the working device is unstable.

Until now, in order to absorb elongation of the wire, a wire length-adjustment member comprising a bolt-nut system has been connected at an end or another suitable position of the wire in the window regulator. Thus, elongation of the wire has been removed by driving the bolt-nut. Also, in another method, a tension pulley is employed to remove elongation of the wire. However, according to these mechanisms for removing elongation of the wire, elongation of the wire must be adjusted in each time that elongation of the wire occurs. Also, performing the adjustment is very annoying, and often difficult.

OBJECT OF THE INVENTION

The main object of the invention is to provide a wire-driving device for a window regulator including a mechanism which can automatically absorb or take up the permanent elongation of the power-transmission wire employed in a wire-controlling window regulator, and which can drive the working device under a constant tension.

A further object of the invention is to provide a wire-driving device for a window regulator which can eliminate the adjustment of the tension of the wire required in the assembly of the window regulator.

A further object of the invention is to provide a wire-driving device for a window regulator which enables the performance of raising and lowering operations of a window glass with substantially the same driving force, so that the driving device can be operated smoothly.

Other objects and advantages of the invention will become apparent from the following description with reference to the drawings.

BRIEF DESCRIPTION OF THE DRAWINGS

FIG. 6 is a partially cutaway side view showing the same embodiment as in FIG. 5;

FIG. 7 is a sectional view taken along line Z—Z of FIG. 6; and

FIG. 8 is a partially cutaway front view showing another embodiment of a window regulator including the wire-driving device of the invention.

DETAILED EXPLANATION OF THE INVENTION

Figure 1:
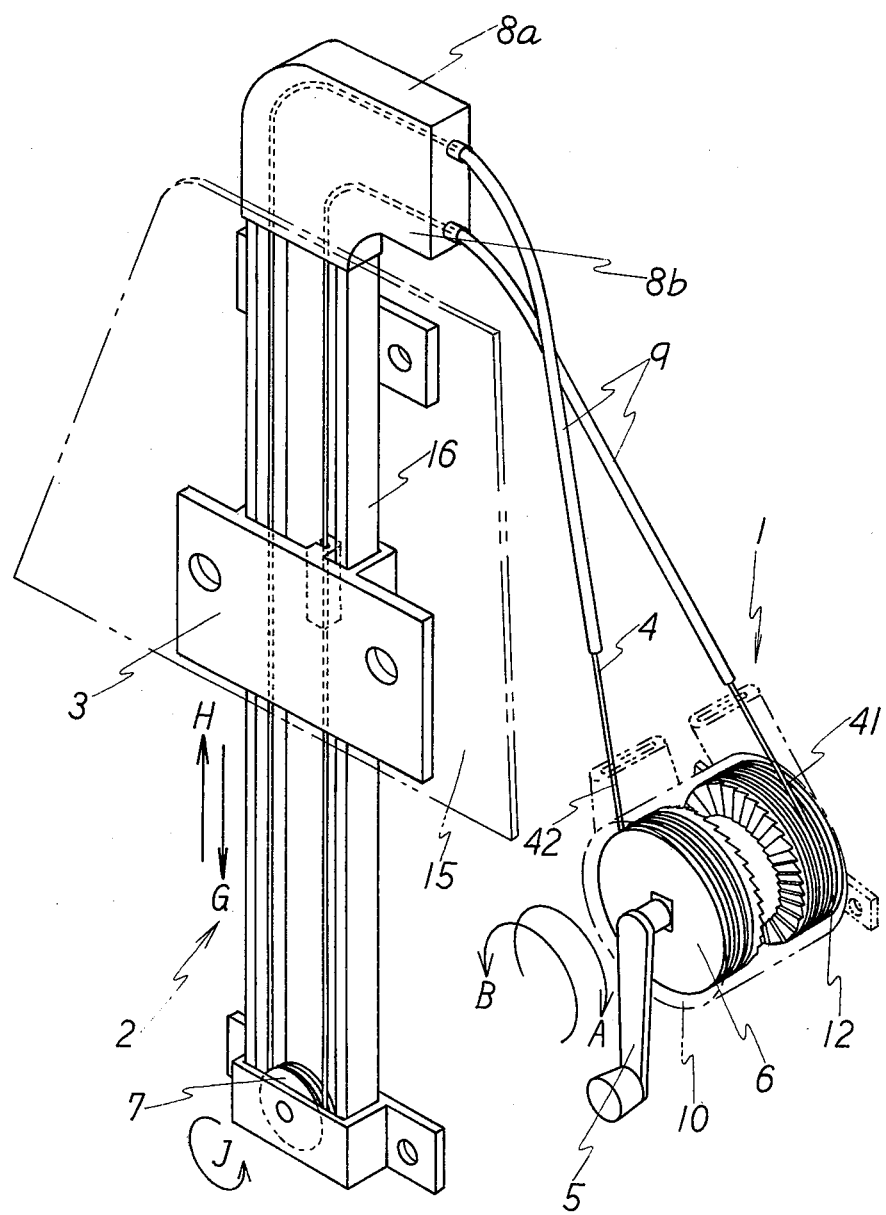
FIG. 1 is a schematic perspective view showing an embodiment of a window regulator including the wire-driving device of the invention.

As shown in FIG. 1, a window regulator consists of a wire-driving device 1, a working device 2 and two flexible guide tubes 9 connecting both devices.

The working device 2 includes a guide rail 16, cable guides 8a, 8b secured to an end of the guide rail 16, an idle pulley 7 supported rotatably at the other end of the guide rail 16 and a bracket 3 provided slidably on the guide rail 16. A window glass 15 is secured to the bracket 3. A nearly central area of the wire 4 is fixed to the bracket 3.

When a lever or crank 5 of the wire-driving device 1 is rotated in the direction A, a first pulley and a second pulley in the wire-driving device are rotated in the direction A, and one end 41 of the wire 4 engaged to the second pulley 12 is pulled into the casing 10, while the other end 42 of the wire 4 engaged to the first pulley 6 is pulled out from the casing 10. Therefore, the idle pulley 7 is rotated in the direction J by the movement of the wire 4, the bracket 3 is slidably moved in the direction H along the guide rail 16, and the window glass 15 is raised. On the contrary, when the lever 5 is rotated in the direction B, the bracket 3 is slidably moved in the direction G, and the window glass 15 is lowered. Thus, the operation of the window regulator for opening or shutting the window glass in automobile, or the like is carried out.

The wire-driving device of the invention can be employed suitably with the window regulator explained above. The wire-driving device is explained below.

Figure 2:
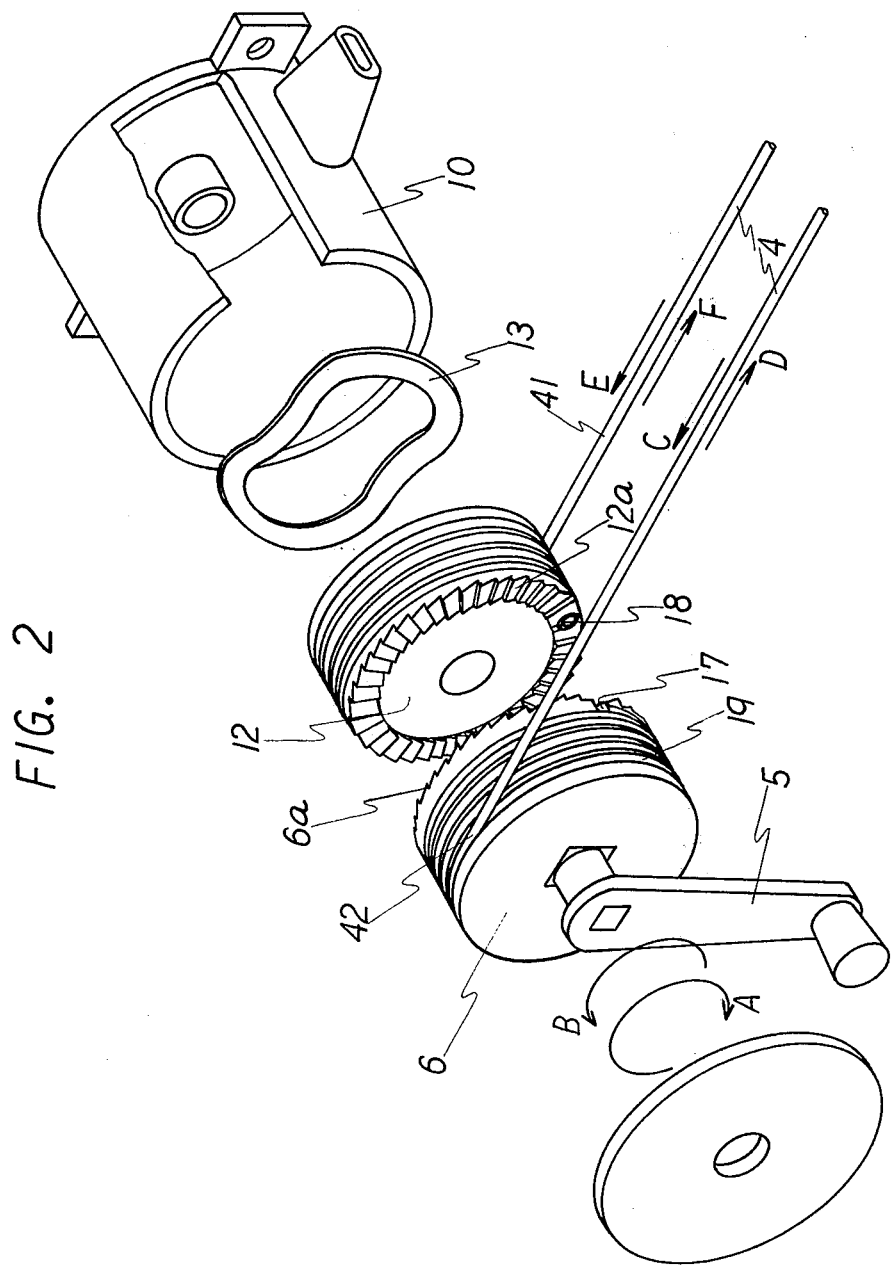
FIG. 2 is an exploded view showing an embodiment of a wire-driving device according to the invention.
Figure 4:
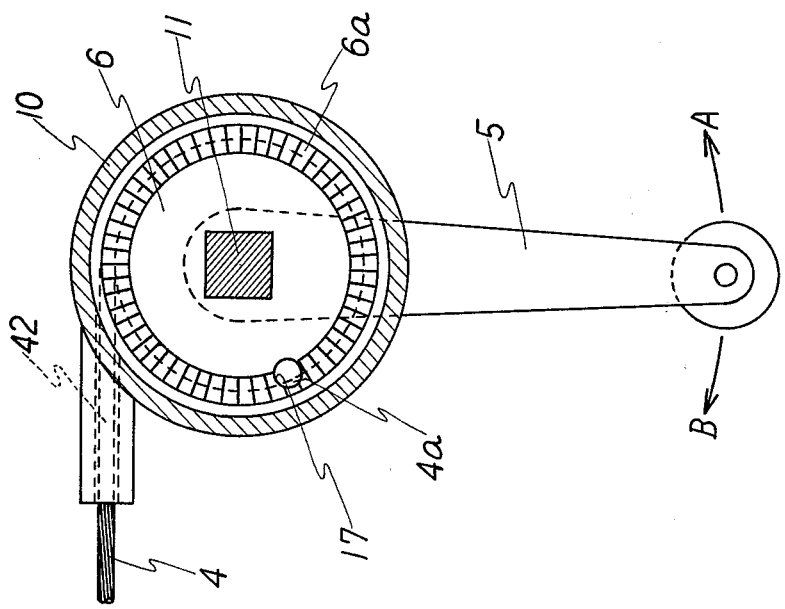
FIG. 4 is a sectional view taken along line Y—Y of FIG. 3.
Figure 3:
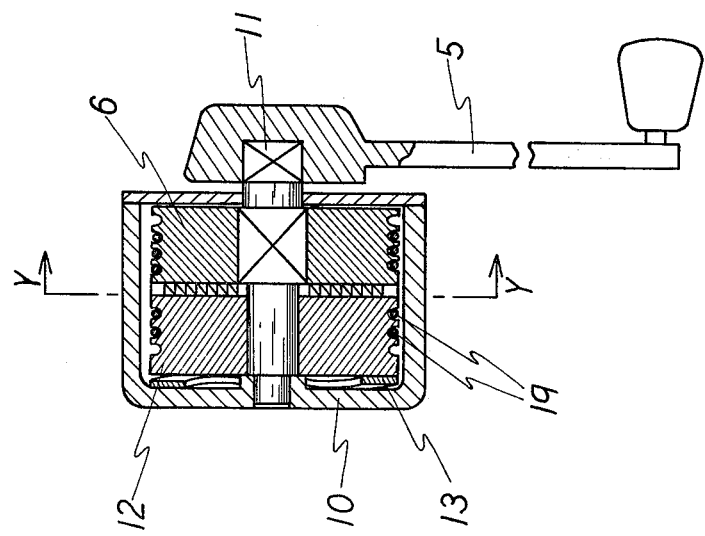
FIG. 3 is a partially cutaway side view showing the same embodiment as in FIG. 2.

In FIGS. 2 to 4, a shaft 11 to which the lever 5 is secured is rotatably supported by the casing 10. A first pulley 6 is provided on the shaft 11 so as to rotate together with the shaft 11. The inner side surface of the pulley 6 is provided over its entire circumference with first ratchet teeth 6a having suitable width. Furthermore, the second pulley 12 adjacent to the first pulley 6 is rotatably supported by the shaft 11, is axially movable in some degree, and is urged toward the first pulley 6 by a spring member 13. The inner side surface of the second pulley adjacent said first pulley is provided with second ratchet teeth 12a capable of meshing with the above first ratchet teeth 6a.

One end portion 42 of the wire 4 extending from the cable guide 8a is wound round the first pulley 6, and the top end 4a of the end portion 42 is fixedly secured in a recess 17 provided in the first pulley (see FIGS. 2 and 4). The other end portion 41 of the wire 4 extending from the cable guide 8b is wound round the second pulley 12, and the top end 4b of the end portion 41 is fixedly secured in a recess 18 provided on the second pulley (see FIGS. 2 and 7).

Hereinafter, the functions and advantages of the invention will be explained.

According to the embodiments shown in the accompanying drawings, when the lever 5 is rotated in the direction A, both ratchet teeth 6a and 12a are meshed with each other. As a result, one end portion 42 of the wire 4 is released from the first pulley 6, and the other end portion 41 is wound round the second pulley 12.

In FIGS. 2 to 4, when the lever 5 is rotated in the direction A, the first pulley 6 is rotated in the direction A by the shaft 11, and simultaneously the second pulley 12 which has the second ratchet teeth 12a meshed with the first ratchet teeth 6a, and which is urged toward the first pulley 6 by the spring member 13, is also rotated in the direction A. Therefore, one end portion 41 of the wire is wound round the second pulley 12, so that the wire 4 is pulled in the direction E, and the other end portion 42 is pulled in the direction D through the idle pulley 7 and is released from the pulley 6. Thus, the bracket 3 secured to the wire 4 is moved in the direction H, and as a result, the window glass is raised as shown in FIG. 1. In that case, elongation of the wire 4 is not absorbed.

When the lever 5 is rotated in the direction B, the first pulley 6 is also rotated in the direction B, and winds up the end portion 42 of the wire 4. If the wire 4 is without slack, the wire 4 is moved in the direction C. Thus, the window glass 15 is lowered, and the end portion 41 of the wire 4 is pulled out from the second pulley 12 in the direction F as shown in FIG. 2. In that case, although both ratchet teeth 6a and 12a are not meshed with each other, the first pulley 6 and the second pulley 12 are rotated as a unit in the same direction.

In the embodiment as shown in FIGS. 2 to 4, elongation which has occurred in the wire can be taken up by rotating the lever 5 in the direction B. That is to say, in the case that the lever 5 is rotated in the direction B shown in FIG. 2 to wind up the end portion 42 of the wire 4 round the first pulley 6 in the direction C, if some elongation is present in the wire 4, the second pulley 12 does not rotate since the end portion 41 of the wire is not immediately pulled in the direction F. In that case, the spring member 13 functions as a brake for stopping the rotation of the second pulley 12. Thus, only the first pulley can be rotated in the direction B without the meshing of both sets of ratchet teeth 6a and 12a to wind up the elongated part of wire 4. As a result, elongation of the wire 4 is absorbed. After the elongation is absorbed the second pulley 12 starts to rotate in the direction B, since the wire is taut enough to pull the end portion 41 of the wire in the direction F. The second pulley 12 is rotated together with the first pulley 6 in the same direction. Accordingly, the working device 2 can function accurately.

In addition, although in coventional window regulators, tension of the wire must be adjusted in assembling the window regulator, according to the window regulator employing the device of the invention, it is easy to get the desired tension by merely winding the wire round each pulley and rotating the lever in the direction B. According to the embodiment as mentioned above, when the lever 5 is rotated in the direction B, only the first pulley 6 in which the end portion of the wire 4 is engaged is rotated to wind up the wire 4, and when the wire reaches to a certain tension, the second pulley 12 in which the other end portion of the wire 4 is engaged starts to rotate in the direction B. For this reason, in the device of the invention, it is very easy to get the desired tension of the wire.

Figure 5:
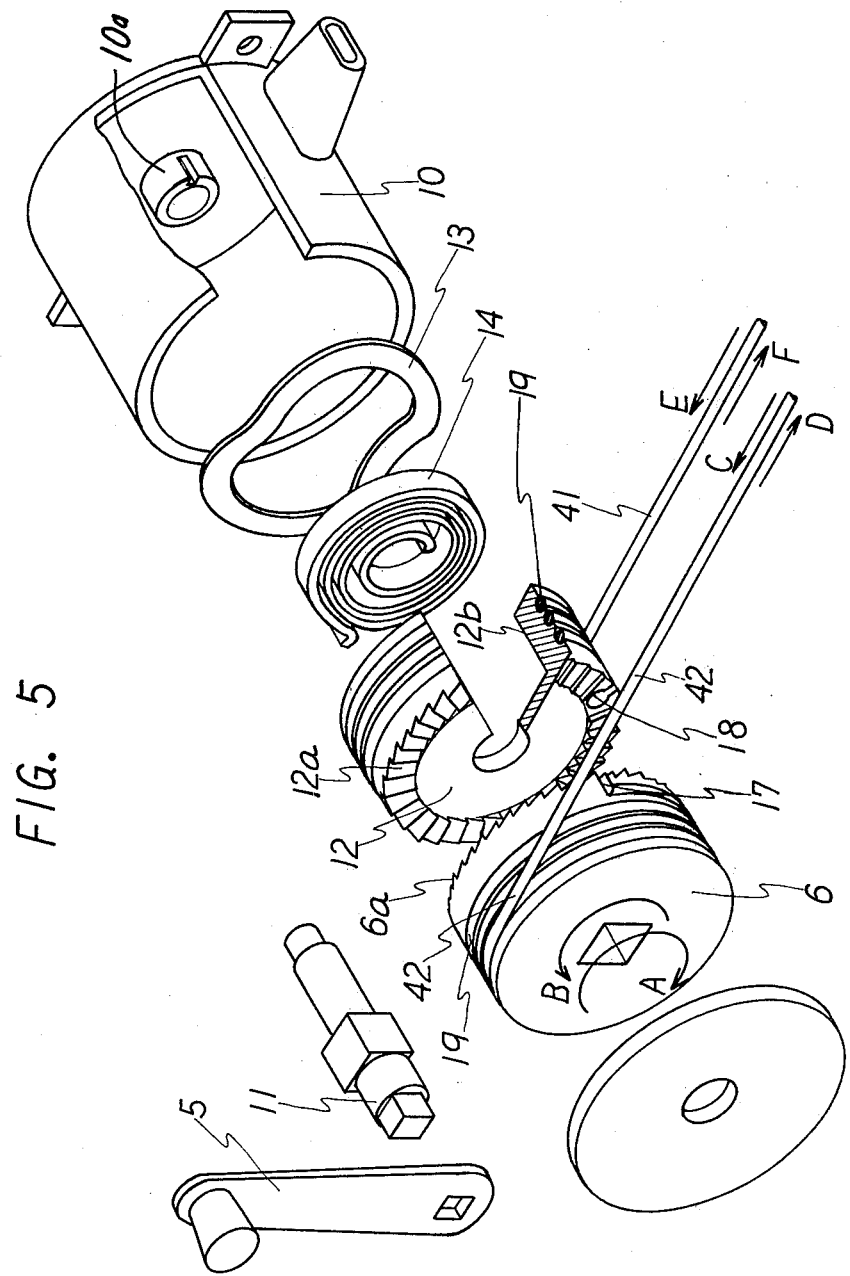
FIG. 5 is an exploded view showing another embodiment of a wire-driving device according to the invention.

Another embodiment of the wire-driving device is shown in FIGS. 5 to 7. In this embodiment, a second pulley 12 is provided with a cavity 12b in the opposite side to the surface provided with the ratchet teeth, and a spiral spring 14 is set in the cavity 12b. One end of the spiral spring 14 is secured to the inner side surface of the cavity 12b, and the other end is secured to the outer surface of a boss 10a projected from inner side of the casing, so that the spiral spring 14 urges the second pulley in the direction A, i.e. the direction that the second pulley 12 is raced. Thus, during the process for absorbing elongation of the wire 4 by rotating the lever 5 in the direction B, the spiral spring 14 can as a brake until the wire has a certain tension. In that case, elongation of the wire 4 is absorbed more smoothly.

In addition, in a window regulator, there is a difference in the actuation force between raising and lowering of the window glass. That is to say, the actuation force of the window regulator becomes heavy when the window glass is raised, and becomes light when the window glass is lowered, due to the weight of the window glass. Therefore, according to the invention, the spiral spring 14 set in the wire-driving device 1 is wound up when the window glass is lowered, and is unwound when the glass is raised, whereby the window regulator can be lightly and smoothly operated.

Also, in the conventional adjusting mechanism employing the bolt-nut system or the tension pulley, there is a limit in the ability for absorbing elongation of the wire. However, according to the invention, since the ratchet teeth are provided on the facing side surface of each pulley, the device absorbs not only a small amount of elongation, but also a large amount of elongation.

In the embodiments shown in FIGS. 1, 2, 4 and 5, both ratchet teeth 6a and 12a are formed over the entire circumference of each side surface of the first pulley 6 and the second pulley 12. However, one of the two sets of ratchet teeth 6a and 12a may be partially formed in the circumference of the side surface, because the other facing ratchet teeth which are formed over all the circumference of the side surface can be always meshed with the above partial ratchet teeth.

Also, in the embodiments mentioned above, although one wire 4 is employed, two wires may be employed to connect between each pulley and the bracket 3.

Furthermore, although FIG. 1 shows that the wire 4 is introduced into the working device through two cable guides 8 secured to one end of the guide rail 16, the invention is not limited in only such a window regulator. For example, as shown in FIG. 8, the wire 4 may be introduced through two cable guides 8a and 8b respectively secured to both ends of the guide rail 16. Accordingly, it is to be understood that some variation and modification are made to the working device.

Further, the first pulley and the second pulley are provided with grooves 19 for containing the wound wire as shown in the accompanied drawings. However, grooves 19 are not essential in the invention.

What is claimed is:

1. An automatic tension-adjusting mechanism for a window regulator comprising:
    a wire arranged in a loop and having two ends;
    a shaft mounted for rotation;
    means for rotating said shaft;
    a first pulley mounted on said shaft and secured thereto; one end of said wire being affixed to said first pulley and a first portion of said wire being wound thereupon;

a second pulley supported on said shaft for rotational and axial movement thereon and being positioned adjacent to said first pulley, the other end of said wire being affixed to said second pulley and a second portion of said wire being wound thereupon in the direction opposite to which said first portion is wound on said first pulley;

said first pulley being formed with first ratchet teeth on the side thereof adjacent said second pulley, and said second pulley being formed with second ratchet teeth on the side thereof adjacent said first pulley and adopted to mesh with said first ratchet teeth;

a spring member arranged to urge said second pulley toward said first pulley to mesh said second ratchet teeth with said first ratchet teeth so that rotation of said shaft in one direction will cause said first ratchet teeth to engage said second ratchet teeth and rotation of said second pulley with said first pulley; and rotation of said shaft in the opposite direction will cause said first ratchet teeth to ride over said second ratchet teeth and allow said first pulley to rotate in that direction with respect to said second pulley whereby any excess elongation existing is said wire loop will be absorbed upon said first pulley, whereafter tension in said wire will cause said second pulley to rotation in the same direction as said first pulley.

2. An automatic tension-adjusting mechanism as claimed in claim 1 further comprising a spiral spring member secured to said second pulley and arranged to apply a rotational force thereto in the same direction that said second pulley would be rotated by said first pulley through engagement of said ratchet teeth, whereby said elongation will be absorbed by said pulley due to said rotational force applied by said spiral spring member.

3. An automatic tension-adjusting mechanism for a window regulator comprising:
a wire arranged in a loop and having two ends;
a shaft mounted for rotation;
a first pulley secured on said shaft for rotation therewith and having one end of said wire affixed thereto;
a second pulley supported on said shaft for rotational and axial movement with respect thereto and having the other end of said wire affixed thereto;
said first and second pulleys each being formed with a plurality of ratchet teeth on their adjacent sides adapted to mesh with each other;

spring means frictionally engaging said second pulley and arranged to urge said second pulley axially on said shaft toward said first pulley to cause meshing of said ratchet teeth, whereby rotation of said shaft in one direction will cause said second pulley to rotation in said one direction with said first pulley; and rotation of said shaft in the other direction will cause said ratchet teeth to disengage and allow said first pulley to rotate in said other direction while said second pulley is retained frictionally by said spring means and thereby takes up any excess elongation existing in said wire loop, whereafter said wire will cause said second pulley to rotate in said other direction.

4. An automatic tension-adjusting mechanism for a window regulator comprising:
a housing;
a shaft mounted for rotational movement within said housing;
a first pulley secured on said shaft for rotation therewith;
a second pulley mounted on said shaft adjacent to said first pulley, said second pulley being rotatably and axially movable on said shaft;
a wire having one end fastened to said first pulley, said wire extending around said first pulley and through a loop including said window regulator and around said second pulley and having its other end fastened to said second pulley;
a first set of ratchet teeth formed on the side of said first pulley adjacent to said second pulley;
a second set of ratchet teeth formed on the side of said second pulley adjacent said first pulley and adapted to engage said teeth of said first pulley;
spring means positioned around said shaft between said second pulley and said housing and arranged to urge said second pulley axially on said shaft against said first pulley to engage said first and second sets of teeth; and
means for selectively rotating said shaft in one direction or the other direction whereby rotation of said shaft in said one direction will rotate said first pulley in that direction and cause engagement of said two sets of ratchet teeth to cause said second pulley to be rotated in said one direction by said first pulley, and rotation of said shaft in said other direction will cause rotation of said first pulley in said other direction to disengage said two sets of ratchet teeth and allow said first pulley to rotate with respect to said second pulley, whereby any excess elongation of said wire will be taken up on said first pulley whereafter tension on said wire will cause said second pulley to rotate in said other direction.

* * * * *